United States Patent [19]

Ganssle et al.

[11] 4,116,263
[45] Sep. 26, 1978

[54] MOUNTING STRUCTURE

[75] Inventors: Eugene Robert Ganssle, Skillman, N.J.; Ralph Richard Scott, Claremont, Calif.; Richard Jean Williams, Marlton, N.J.

[73] Assignee: RCA Corporation, New York, N.Y.

[21] Appl. No.: 750,401

[22] Filed: Dec. 14, 1976

[30] Foreign Application Priority Data

Jan. 30, 1976 [GB] United Kingdom ............... 03793/76

[51] Int. Cl.² ............................................ G05D 23/00
[52] U.S. Cl. ...................................... 165/27; 165/32; 244/158
[58] Field of Search ..................... 165/27, 32; 244/158, 244/163; 248/179

[56] References Cited

U.S. PATENT DOCUMENTS

| | | | |
|---|---|---|---|
| 3,489,203 | 1/1970 | Fischell | 165/32 |
| 3,519,490 | 7/1970 | Lieberman | 165/32 X |
| 3,520,734 | 7/1970 | Scheve et al. | 165/32 X |
| 3,749,156 | 7/1973 | Fletcher et al. | 165/32 |

*Primary Examiner*—Gerald A. Michalsky
*Attorney, Agent, or Firm*—H. Christoffersen; Samuel Cohen; William Squire

[57] ABSTRACT

A mounting platform for heat producing instruments operated in a narrow equilibrium temperature range comprises a grid-like structure with relatively large openings therein. The instruments are secured to and thermally coupled with the grid surface facing the instruments. Excess heat from the instruments is selectively radiated to the ambient through openings in the grid, the grid surfaces at these openings exhibiting low thermal emissivity and adsorptivity. The remainder of the grid is maintained at the equilibrium temperature and is covered with a thermal insulating blanket. Thus, the entire system including the platform and instruments is maintained substantially isothermal, whereby the instruments remain in fixed physical relationship to one another.

14 Claims, 10 Drawing Figures

MOUNTING STRUCTURE

The invention described herein was made in the performance of work under NASA Contract No. NAS 5-20644 and is subject to the provisions of Section 305 of the National Aeronautics and Space Act 1958, Public Law 85-568 (72 Stat. 435; 24 USC 2257).

The present invention relates to thermally stable mounting platforms for maintaining precise alignment of instruments secured thereto.

In many instances elements such as sensors, optical devices and other instruments need to be maintained in precise alignment with respect to a reference. In some applications such alignment can be achieved in a simple direct manner by securely fastening the elements to a common supporting structure. The latter must be rigid and in some applications, such as in satellites, must also be light. Further, if the secured elements produce heat, this heat must be rapidly dissipated to lessen temperature gradients in the supporting structure, which gradients might tend to warp or otherwise distort the structure. Such distortion would be undesirable as it could cause misalignment of the secured elements.

As provided by the present invention, a thermally stable mounting system comprises a thermally conductive grid-like platform having a plurality of openings. A heat generating device is secured to the platform in a given orientation, the device tending to exhibit a temperature greater in magnitude than a given value. Temperature control means are coupled to the platform and the device for maintaining the platform and device substantially isothermal at a temperature of about the given value. The control means includes means for selectively radiating thermal energy to the ambient from the device through the platform openings for maintaining the device at the temperature of about the given value.

Figure 1:
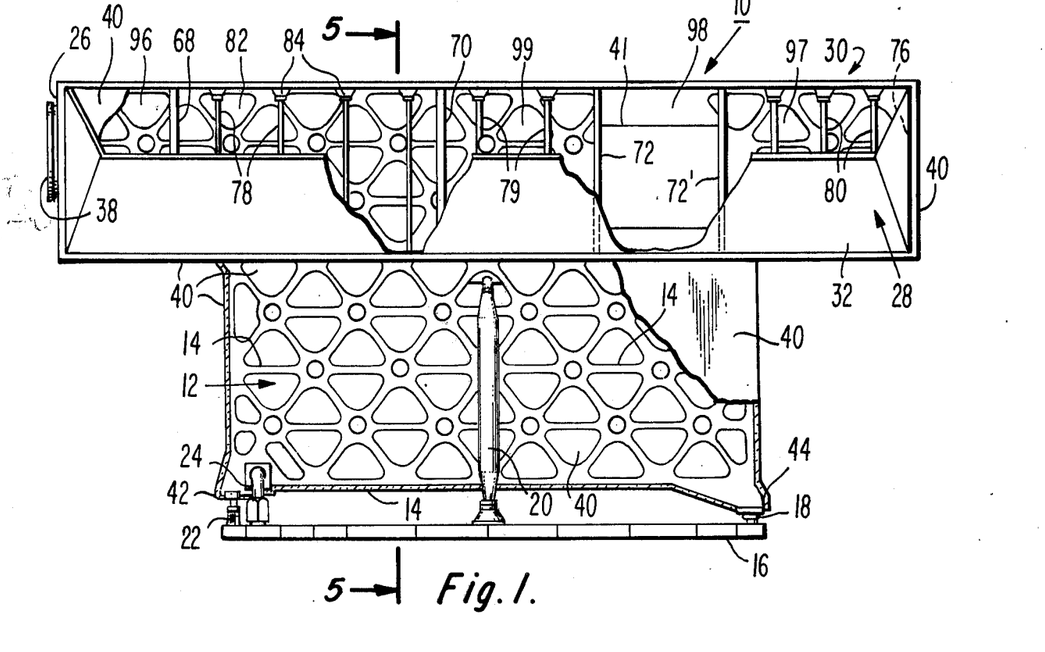
FIG. 1 is a front, partially fragmented, elevation view of a support structure constructed and operated in accordance with an embodiment of the present invention.
Figure 2:
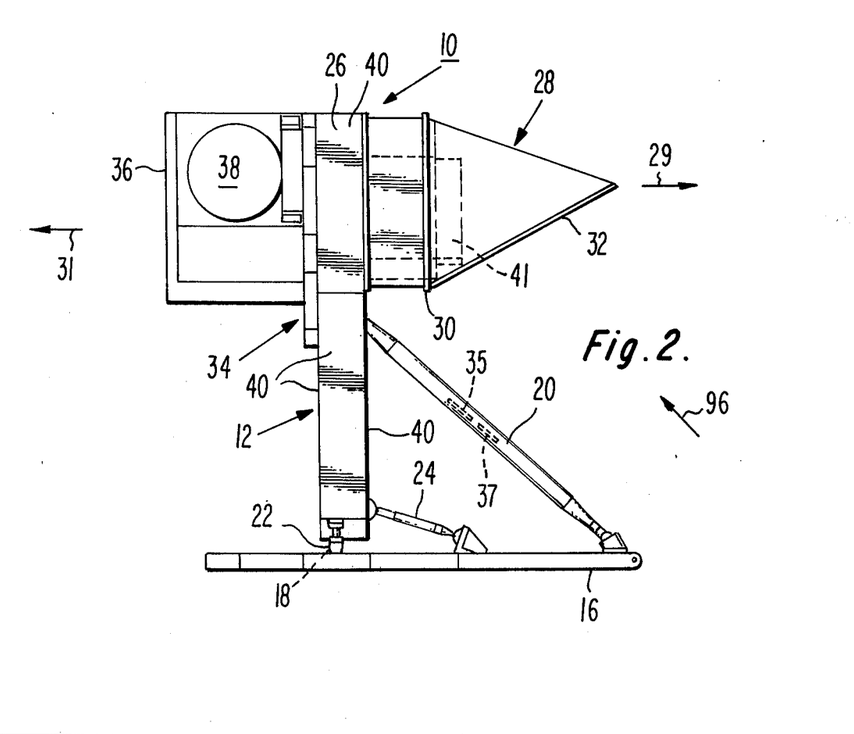
FIG. 2 is a side elevational view of the structure of FIG. 1.
Figure 3:
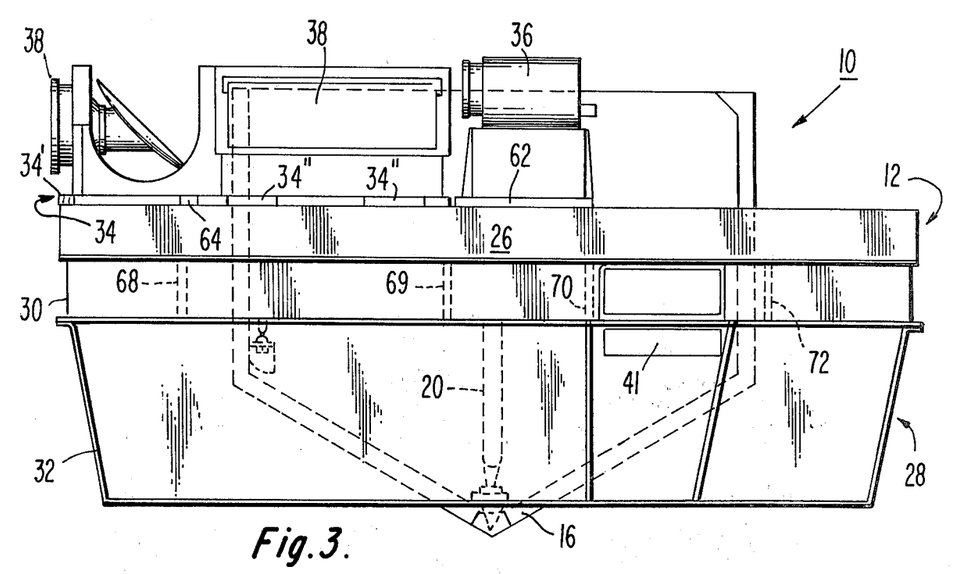
FIG. 3 is a plan view of the structure of FIG. 1.

In FIGS. 1, 2 and 3, structure 10 includes a T-shaped grid 12 formed of a plurality of interconnected struts 14. The grid may be machined from one piece of a light weight, highly conductive metal such as aluminum; however, in production, it would be formed of a plurality of parts, in a few different shapes, which are brazed, welded or otherwise conductively and ridigly secured to one another. Structure 10 is mounted on a base 16 via a plurality of supporting links 18, 20, 22 and 24 and secured to an earth orbiting spacecraft. The grid 12 includes an upper T section 26, the front surface on which is mounted instrument sensor and cooling assembly 28 which faces deep space (direction 29). Assembly 28 includes a louver assembly 30 and a sunshade assembly 32. Mounted within assembly 28 to grid 12 via adapters (not shown) is Inertia Measuring Unit (IMU) 41. Mounted on the opposite rear surface of grid 12 section 26 facing the earth (direction 31) are a plurality of instrument mounting adapters 34. Adapters 34, in turn, receive instruments such as sensors, antennas, and so on which are to be mounted to the structure 10 and which are oriented to face the earth. For example, in one satellite structure, some of the instruments may include a stratospheric sounder unit (SSU) 36 and an advanced very high resolution radiometer (AVHRR) 38. The SSU and AVHRR are mounted on selected ones of the adapters 34 in a manner to be explained in conjunction with FIG. 4. Other instruments may be mounted to the structure 10 on the front and rear surfaces at any suitable location on the grid 12 but which are omitted in the interest of simplicity of illustration and explanation. Surrounding and encasing the grid 12 at selected surfaces thereof is a suitable thermal radiation and conductive insulation blanket 40 which is shown fragmented in the interest of showing the grid 12 more explicitly. Blanket 40 is of a conventional commercially available material comprising layers of insulating material and netting.

One purpose of the apparatus embodying the present invention is to maintain the sensors and the like devices secured to grid 12 oriented to a common reference location. However, several of these sensors, for example, AVHRR 38, SSU 36 and others (not shown) may produce heat which must be dissipated. Some of the sensors producing heat face earth (direction 31). Earth is a heat source and limits the amount of heat which can be radiated from the sensors which are radiation-coupled to earth. In the presence of such heat, the apparatus of the present invention will maintain the sensors in the desired orientation with respect to each other while dissipating the excess heat.

All of the sensors in the exemplary embodiment are permitted to have their common reference location shifted in unison. Therefore, grid 12 is permitted to rotate and shift in orientation in unison with respect to base 16. No portion of the structure should shift with respect to any other portion beyond negligible amounts determined by the accuracy and goals of the sensors.

Some of the sensors (not shown) are attitude reference sensors and are coupled to the spacecraft attitude control system (not shown) which stabilizes and orients the spacecraft (not shown) including structure 10 with respect to earth. Other sensors are mission sensors which detect conditions at particular locations on earth to fulfill the mission of the spacecraft. Therefore, the attitude and mission sensors must be tied to a common reference location within the limits of the desired accuracy. As can be appreciated, slight errors in orientation between sensors can result in large unacceptable errors in fulfilling the satellite mission.

One problem solved by the present invention is the recognition that the heat produced by the sensors mounted on grid 12 could produce temperature gradients in the grid 12 and could cause degradation or failure of the mission unless otherwise prevented. These temperature gradients are substantially avoided in the present invention by making the structure and sensors substantially isothermal. A second problem is solved by links 18-24. Links 18, 20, 22 and 24 rigidly support structure 10 to base 16, but, as will be described, permit the shifting of the plane of grid 12 with respect to base 16 in response to thermal expansion and contraction of any of the links without distorting that plane. Further, assembly 28 and the grid construction provide temperature control by permitting radiation of thermal energy from the heat producing sensors, to space, through the grid structure with negligible effects on the temperature of the structure. Additional temperature control means, as will be described in cooperation with grid 12 control the structure and sensors' temperature to within ±1° C in the exemplary embodiment. This temperature range, of course, is an example, in practice the size and limits of the range chosen will depend upon the requirements of the particular engineering design.

Louver assembly 30 is described in more detail in copending application Ser. No. 573,747 filed May 1, 1975 now abandoned, entitled "Actuator Device" by Richard Jean Williams and assigned to the assignee of the present invention. A brief explanation of the louver assembly 30 will be made in connection with FIG. 8 later herein.

The grid structure provided by the struts 14 provides an extremely light weight but stiff and rigid support. This is of extreme importance in a satellite environment as can be appreciated. At the same time, the struts 14 provide a relatively small area facing the ambient as compared to the spaced enclosed by the struts. For example, in one embodiment, the surface area of the struts 14 forming grid 12 comprises approximately only 30 percent of the area of the grid 12 in a direction in and out of the drawing of FIG. 1. The relatively small area of the strut 14 surface facing the ambient as compared to the overall area enclosed by the grid 12 has an additional importance. This importance relates to providing a large open area through which heat producing sensors such as the SSU 36 and the AVHRR 38 may radiate thermal energy into the ambient via cooling assembly 28.

Figure 4:
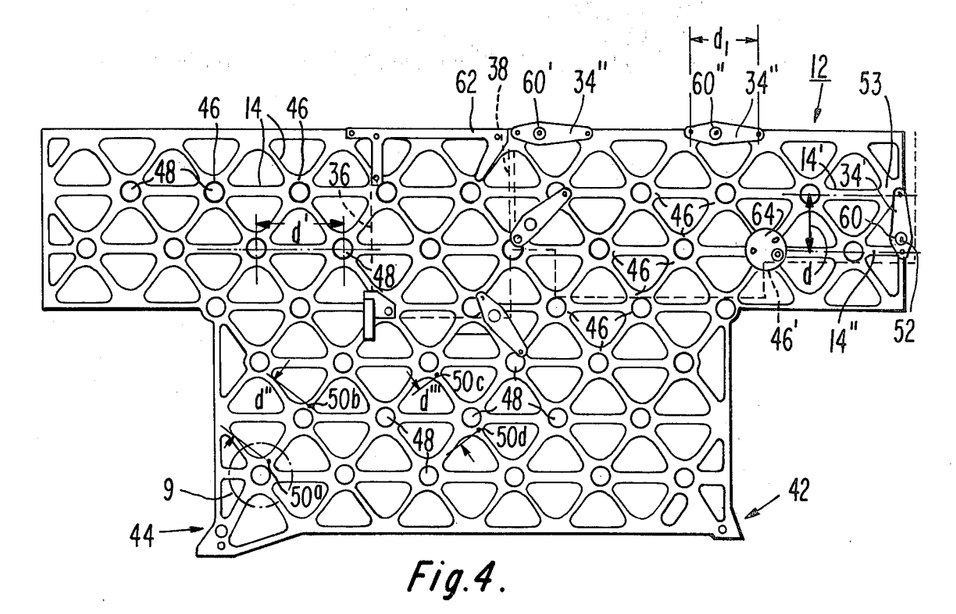
FIG. 4 is a rear elevational view of the framework of the structure of FIG. 1.

In FIG. 4 the grid 12 is shown enlarged and in more detail. Struts 14 are interconnected to form a modular triangular truss network. A majority of the struts 14 are substantially the same in length, width, cross section, and depth. However, certain of the struts may be altered in length and width to fit a particular position such as base corners 42 and 44. The intersections of the struts are generally uniformly spaced throughout the grid 12. The intersecting ones of struts 14 generally terminate in an annular connecting link 46 in which is centrally disposed a weight reducing hole 48. A link 46 and hole 48 disposed at each of the intersections of struts 14 except at the edges of the structure where the struts 14 are joined in a gusset arrangement.

Figures 7, 8, 9:
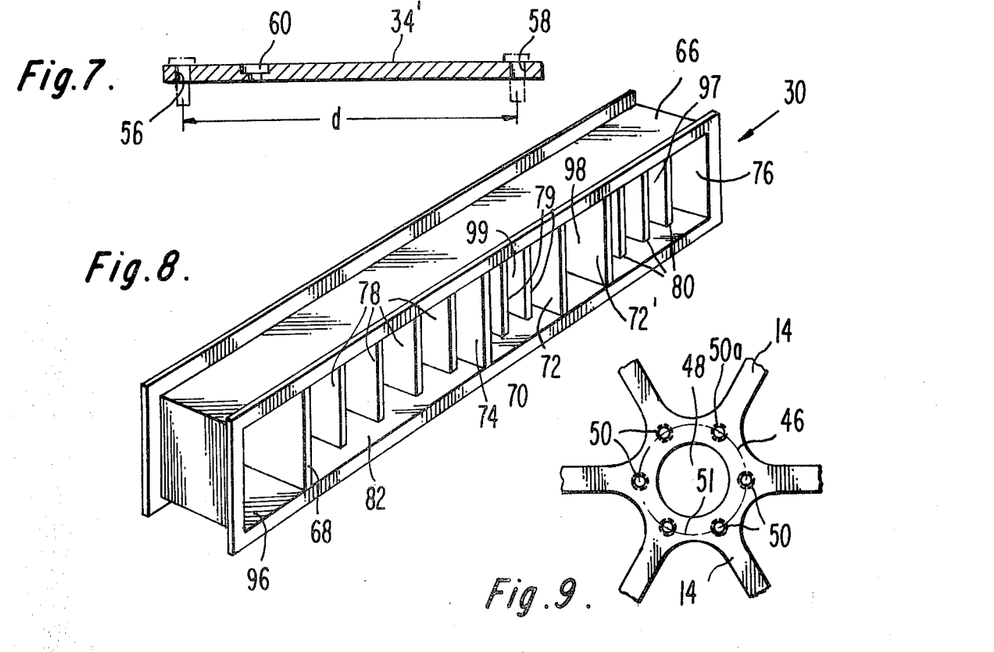
FIG. 7 is a sectional view of the adapter of FIG. 6 taken along lines 7—7.
FIG. 8 is an isometric view of a louver housing structure used in the embodiment of FIG. 1.
FIG. 9 is an enlarged elevational view of the portion of the structure of FIG. 4 shown in the dashed circle.

The annular connecting link 46 serves an additional function as best seen in FIGS. 4 and 9. Disposed in links 46 at the intersection with each of the struts 14 are threaded apertures 50. threaded apertures 50 lie on a bolt circle 51 of a given diameter on a majority of links 46. Not all links 46 have apertures 50.

Each bolt circle 51 is concentric with its corresponding hole 48. The center-to-center spacing $d'$ between adjacent holes 48, and thus, bolt circles 51, repeats throughout the structure. The bolt circle diameter on each link 46 is substantially the same throughout. Further, the threaded apertures 50 are equally spaced on each circle 51. In certain locations, special spacings between apertures 50 may be provided which are unique to a given location on the grid. For example, spacing $d$ is one such spacing. In this case, adapter 34' is secured at one end to a gusset 53 and at the other end to the junction between strut 14" and the grid side member. Spacing $d$ essentially is the perpendicular distance between the center lines of parallel struts 14' and 14".

As is now apparent, apertures 50 are disposed throughout the structure in a generally uniform matrix. Thus, a selected array of apertures on the same or different links 46 have a spacing therebetween which repeats throughout in a variety of different orientations. For example, the spacing $d''$ between apertures 50a and 50b and spacing $d'''$ between apertures 50c and 50d exemplify one such spacing. Many others can be identified. The essential feature of the apertures 50 locations is the resulting universal utility of grid 12. Thus, a variety of differently configured sensors and the like may be secured to the grid 12 at any desired location on the grid via a suitably designed adapter secured to apertures 50.

Figures 5, 6:
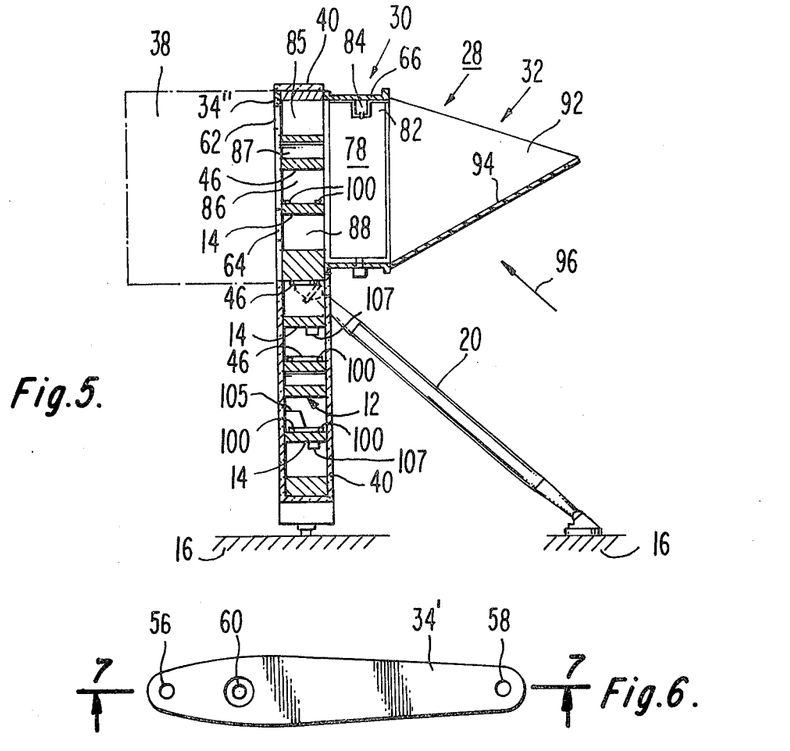
FIG. 5 is a side sectional view taken along lines 5—5 of FIG. 1.
FIG. 6 is a plan view of an instrument mounting adapter for use on the structure of FIG. 1.

For example, the mounting feet for the AVHRR, SSU, IMU or the like may be disposed at locations intermediate the struts 14. Such a location is indicated at 52, FIG. 4. Location 52 defines that point at which one of the feet for the AVHRR 38 is located. This location is intermediate struts 14' and 14". Adapter 34' provides support for the AVHRR mounting foot at location 52. FIGS. 6 and 7 illustrate adapter 34' which is one of many different configurations possible for adapters 34 for use in the grid 12. Adapter 34' is a metal or other good thermal conductor material having a hole 56 disposed at one end and a second hole 58 disposed at the other end. Holes 56 and 58 are separated spacing $d$, FIG. 7. Threaded fasteners, shown in phantom in FIG. 7, bolt adapter 34' to corresponding threaded apertures 50 disposed at the ends of struts 14' and 14" and separated spacing $d$. Adapter 34' has a countersunk bore 60 for receiving a mounting foot of AVHRR bolted thereto and which is located at location 52 when secured to grid 12, FIG. 4. Adapter 34' provides direct thermal conductive coupling between the AVHRR 38 (dashed) body and the grid 12 structure.

Adapters 34" are similar to adapter 34' but have a spacing $d_1$ different than spacing $d$ and $d''$. Adapters 34" receive the mating support feet of AVHRR 38, FIG. 4. Different shaped adapters may be provided to suit a given need. For example, adapter 62 for the SSU 36 has an elongated channel shape as shown. Circular adapter 64 may be provided to locate a supporting foot for AVHRR 38. Adapter 64 has a pair of holes aligned with selected ones of apertures 50 link 46' which permit adapter 64 to be secured to link 46'.

It will be appreciated that apertures 50 may be located at the end of only certain selected struts 14 as desired. In addition to or in place of threaded apertures 50, unthreaded bores (not shown) may be provided. Such bores may be used as locating devices or mounting or locating holes for sensors and other equipment.

Figure 10:
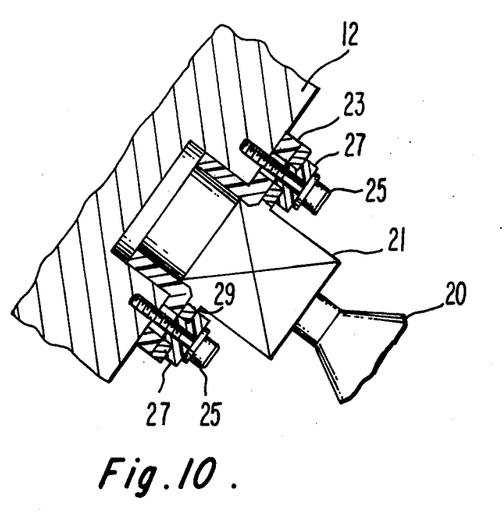
FIG. 10 is an enlarged sectional view of one of the mounting arrangements for securing the framework of the structure of FIG. 1.

To maintain the grid 12 in the upright position, FIGS. 1 and 2, supporting links 18, 20, 22 and 24 are provided spaced as shown. Link 20 includes a rod connected at one end to base 16 and to grid 12 approximately centrally thereof at the other end by suitable ball connecting joints at each end. In a similar manner, links 22 and 24 each include a rod connected at one end to base 16 and grid 12 with ball joints at each end. Link 18 is a ball joint connected to corner 44 at the grid 12 bottom surface. Link 24 extends as close to the horizontal as possible (normal to the plane of grid 12). Link 22 is disposed between base 16 and the bottom surface of corner 42 approximately vertical (normal to base 16). Corner 44 is closer to base 16 than corner 42. Each of the links 18–24 is thermally isolated from grid 12 by suitable thermal isolation mounts at the grid 12 end of the links. For example, as shown in FIG. 10, link 20 is connected to grid 12 via ball joint 21 and insulating sleeve 23. Joint 21 is secured to grid 12 at flange 29 by bolts 25 which are insulated from joint 21 by insulating sleeves 27. Suitable similar thermal insulating mounting devices are located between each of the remaining links 18, 22 and 24 and grid 12.

The links 18, 20, 22 and 24 are located and arranged to rigidly secure grid 12 to base 16 and prevent distortion of the grid 12 during thermal expansion and contraction action of the links due to temperature shifts by permitting the grid to shift as a plane in the presence of such expansion and contraction.

Links 18–24 rigidly secure grid 12 as follows. Link 18 being a ball joint provides translation support for grid 12 in three orthogonal directions (and thus all directions). Link 22 supports a translation load in only the vertical direction. Link 24 supports a translation load substantially in the horizontal direction in and out of the drawing at corner 42. Link 20 supports a moment load on grid 12 rotating about an axis formed by corners 42 and 44. In FIG. 2, it can be seen that link 20 prevents rotation of grid 12 clockwise and counter clockwise about links 22 and 18. Thus, essentially, three point support is provided grid 12 at corners 42 and 44 and approximately centrally at link 20 in three orthogonal directions (and therefore all directions) for both torque and translation motions. For example, all vertical translations are precluded by links 18 and 22. All transverse motions left to right in the drawing are precluded by link 18. All translations in and out of the drawing are precluded by links 18, 20 and 24. All rotations about the axis formed by corners 42 and 44 at links 18 and 22 are prevented by link 20. All rotations in the horizontal plane about an axis extending through link 18 in the vertical direction are prevented by links 20 and 24. Link 18 prevents rotation about an axis not extending therethrough.

However, links 18–24 also prevent distortion of grid 12 in the presence of thermal expansion (or contraction) at any of the links. Such expansion or contraction would result in a displacement of the grid 12 with respect to the base 16. The link orientation and deployment and the ball joints permit the grid to rotate as a unit in the presence of such displacement.

For example, assume that link 20 expands. This expansion tends to torque grid 12 about links 18, 22 and 24. The ball joints in all of the links permit grid 12 to rotate without inducing any internal stresses into grid 12. In essence, the change in length of one leg of a three legged support merely rotates the supported plane but does not distort it. As a second example, assume expansion of link 22. This action tends to separate corner 42 from base 16. Grid 12 thus rotates about link 18 in the vertical direction. However, links 20 and 24 remain the same length. They cause the grid to rotate slightly about link 18 in a plane parallel to base 16. The ball joints at link 22 permit this motion as do all of the other ball joints. It can be shown that expansion (or contraction) of any of the links results in a rotation of grid 12 and, thus, no distortion inducing stresses.

Cooler assembly 30 is described in greater detail in the aforementioned copending application Ser. No. 573,747 filed May 1, 1975 now abandoned. Briefly, assembly 30 includes an aluminum frame 66, FIG. 8. Frame 66 is thermally conductively isolated from grid 12 by suitable isolation mounts (not shown). The exterior surfaces of frame 66 are finished with a low ($\epsilon$) emissivity, ($\alpha$) absorptivity not being a factor due to the shading of frame 66 from the sun. In the alternative, frame 66 may be encased with blanket 40. Frame 66 is divided into a plurality of compartments 82, 96, 97, 98 and 99 by aluminum dividers 68, 70, 72 and 72'. The interior compartment surfaces, e.g. 74 and 76 are highly polished mirror-like surfaces which have low emissivity and low absorptivity. Substantially, all thermal energy radiating between the dividers and frame 66 is reflected through frame 66 without substantial absorption or scattering by the frame 66 or the dividers. Disposed between dividers 68 and 70 is a plurality of louvers 78; between dividers 70 and 72, louvers 79; and between divider 72' and the outer wall of frame 66, louvers 80. The compartment 82 in which louvers 78 are disposed is in alignment with the AVHRR 38 which is secured on the side of grid 12 opposite assembly 30. The SSU is in alignment with compartment 99. As an option, a heat generating instrument (not shown) may be disposed in alignment with compartment 97.

Operation, construction and control of louvers 78 is described in the aforementioned copending application. That construction includes actuator devices 84, FIG. 5, each of which includes a bimetal actuator operated by a control unit (not shown) in response to the temperature sensed on the AVHRR 38 by sensors (not shown). As the AVHRR 38 increases in temperature above a given threshold, the sensors (see aforementioned copending application) signal the control unit (not shown) causing the actuators 84 to open the louvers 78 to the position shown. When the temperature of AVHRR 38 is below that threshold temperature, the control unit operates actuators 84 to close louvers 78 to a position 90° from that shown. The purpose of the louvers 78 is to couple and decouple the thermal energy radiated by the AVHRR 38 to the ambient. This thermal energy is radiated from that portion of AVHRR 38 facing grid 12 passing between struts 14 and holes 48 thence through the louvers 78 into the ambient. Should the temperature of the AVHRR 38 be below the desired threshold level, the louvers 78 are closed preventing the radiating of thermal energy to the ambient and, therefore, result in the heating up of AVHRR 38. The walls of frame 66 and the side walls of struts 14 and holes 48 in the line of sight of AVHRR 38 are highly polished having low emissivity and low absorptivity surfaces to provide specular reflection with relatively little diffusion and dispersion of the thermal radiation from AVHRR 38. There is radiation coupling between grid 12 and AVHRR 38 on the exterior surfaces of grid 12 facing AVHRR 38. However, there is negligible absorption of the thermal radiant energy from AVHRR 38 on grid interior walls 85, 86, 87 and 88, FIG. 5, when the louvers 78 are placed in the closed position. Walls 85, 86 and 88 may be provided by inserts of suitable 5 mil thick sheets of polished aluminum. The thermal energy from AVHRR 38 raises the temperature thereof above the desired threshold level. The purpose of this action is to maintain the temperature of AVHRR 38 and grid 12 substantially constant within ±1° C.

A suitable sunshade 32 is mounted on the exposed edges of frame 66 to prevent the sun rays 90 from directly impinging upon louvers 78 and exposed grid 12. Sunshade 32 is made of thermally insulating material such as thermoplastic foam whose interior walls 92 and 94, for example, are lined with low emissivity and low absorptivity surfaces. The surfaces of sunshade 32 may be provided by suitable thermoplastic tape having vapor deposited aluminum thereon. The tape may have a thickness in the order of 1 or 2 mils. The exterior surfaces of sunshade 32 are made of high emissivity material having a low thermal energy absorptivity of thermal energy from the sun. By low emissivity ($\epsilon$) and low absorptivity ($\alpha$) is meant a range of $\alpha$ and $\epsilon$ of up to about 0.25 whereas high emissivity and high absorptivity is meant a range greater than 0.75.

The SSU 36 is mounted on certain of adapters 34 on the surface of grid 12 opposite frame 66 adjacent AVHRR 38. Suitable sensors are thermally coupled to the SSU 36 for operating the corresponding louvers 79. The operation of louvers 79 is similar to that described above for louvers 78.

The compartment 96, FIG. 8, formed by divider 68, has no corresponding heat producing instrument mounted on the opposite side of grid 12, the AVHRR 38 portion at that location being passive. Therefore, the grid 12 in compartment 96 is covered with thermal insulating blanket. The insulating blanket is attached to the grid 12 throughout by suitable fastening devices such as commercially available hook and pile thermoplastic strips (not shown). Disposed in the compartment 98 between dividers 72 and 72' is IMU 41. Blanket 40 is disposed on grid 12 on the side opposite IMU 41. The IMU is provided a predetermined constant heat dissipation rate. The IMU is a device housing various instruments including gyros and the like which need not face the earth. The IMU has surface coatings selected to maintain the IMU within the desired temperature range of grid 12 by radiating internally generated heat to space. Because the radiation dissipation is made substantially constant, there is no need to provide the IMU 41 with temperature regulation via louvers. The IMU 41 is thermally isolated from grid 12 via the IMU 41 mounting feet. Blanket 40 covers compartment 98 on the earth facing side of grid 12 thermally isolating the IMU 41 from earth. Should no heat producing instrument be mounted adjacent compartment 97, grid 12 at this location may also be covered with blanket 40 and louvers 80 omitted.

Exposed at spaced locations on the various struts 14 and the annular connecting links 46 are resistors 100, FIG. 5, in the order of about one tenth watt each. Temperature sensors 107 are provided at selected location on the grid for sensing the grid temperature. Sensors 107 via suitable control means such as described in the aforementioned copending application regulate the flow of current to the resistors to control the heat supplied by the resistors to maintain the temperature of the grid substantially constant. This heat makes up for the slight thermal leakage to the ambient which may be present. The temperature is regulated to that which is present at the region where the instruments are secured to the grid. The currents are carried by wires 105 (partially shown) secured to the grid or disposed in conduits in the grid and connected to the control which determines the temperature to be maintained. The temperature gradients produced by resistors 100 are negligible with respect to any distorting effects on grid 12. Encasing all of the exposed portions of grid 12 on the upper, lower, sides, front and rear surfaces is blanket 40. Heaters 35 and sensors 37 (FIG. 2) are also disposed on links 18-24 for controlling their temperature. Links 18-24 are also encased in blanket 40.

In the operation of the system described, the sensors such as AVHRR 38 secured to one surface (at the upper section 26 of the T) of the grid produce heat. This heat is both conductively and radiation coupled to the surface of the grid. When the sensors or other instruments reach the desired operating temperature, the louvers open and the heat produced by the sensors passes through the openings in the grid and the louvers and reflected by sunshade 32 to the ambient. The operation is such that the sensor temperature is regulated to a narrow range and the grid, at the surface thereof heat coupled to the sensors, achieves this same temperature. The other surfaces of the grid in the region at the upper section 26 of the T where the sensors such as AVHRR 38 are fixed, are formed of highly polished material and therefore the radiation to and from these surfaces and the ambient is very low. Therefore the temperature of these other surfaces due to heat radiation to or from these other surfaces to the ambient does not change substantially and no temperature gradient from this cause develops between these surfaces and the surface of grid 12 which is radiation and heat coupled to the instruments. As the grid is formed of highly conductive material, heat rapidly is conducted from the surface on which the sensors or other instruments are mounted to the remaining grid surfaces, such as the one on which the assembly 28 is mounted, so substantially no temperature gradients are present between such surfaces.

The lower portion of the T is heat insulated from the ambient by insulating blankets. It quickly attains the equilibrium temperature by conduction and as it is substantially radiation isolated from the ambient loses substantially no heat to and gains substantially no heat from the ambient. Moreover, means such as sensors 107 are provided for sensing the grid temperature for supplying heating current, as needed, to resistors 100, for maintaining the grid temperature constant. Thus, all parts of the gridlike mounting structure from one end to the other and from one surface to the other are maintained in a narrow reference temperature range —the grid is substantially isothermal. Moreover, as already explained, the grid can translate a small amount or rotate a small amount with substantially no component of movement of one part of the grid relative to another. Thus, the grid is dimensionally stable both because it is isothermal and because of the way it is secured to the base. Thus, the sensors or other instruments fixed to the grid remain in physical alignment.

Grid 12 was described above as a structure which could be machined from a solid block of aluminum. A cheaper alternate construction using sheet metal is as follows. The grid front and rear surfaces are stamped from sheet metal each appearing as a planar truss network. Accurately located holes are formed on the two sheets at the location of holes 48. A plurality of identical axially grooved spindles space the two sheets from each other. The grooves are spaced about the spindle periphery at the approximate location corresponding to the junction of struts 14 with links 46. The grooves extend the length of the spindle. The opposite ends of each spindle are accurately formed with stepped shoulders to closely fit into the stamped sheet metal holes corresponding to holes 48. Each spindle thus spaces the stamped sheets a spacing corresponding to the length of the grooves and are disposed approximately at the location of holes 48. A plurality of webs are formed from sheet metal and fitted into selected ones of the grooves in the spindles. The webs and stamped sheet metal front and rear surfaces form the struts. The webs, sheet metal front and rear surfaces and the spindles are then brazed or welded together forming an integral grid structure. The spindles may be smaller in diameter than links 46 and need not include apertures 50 or holes 48. Instead, a single adapter mounting hole may be formed centrally in each end of the spindles. Suitable adapters may then be mounted directly to such holes. Further, to allow for warpage after welding, metal caps may be fitted into the ends of the spindles. The caps, after all welding is completed, may then be machined to form a common sensor mounting plane. The adapters for the sensors and other instruments are then secured to the caps at the machined surfaces thereof.

What is claimed is:

1. A thermally stable mounting system comprising:
   a thermally conductive grid-like platform having a plurality of openings extending through the platform from one side to the opposite side thereof,
   a heat generating device secured to one of said sides of the platform in a given orientation, said device tending to exhibit a temperature greater in magnitude than a given value, and
   temperature control means coupled to said platform and said device for maintaining said platform and device substantially isothermal at a temperature of about said given value, said control means including means for selectively radiating thermal energy to the ambient from said device at said one side through said platform openings past the other side for maintaining said device at a temperature of about said given value.

2. The system of claim 1 wherein said selective radiation of thermal energy passes through certain of said openings, said temperature control means including thermal energy radiation insulating means encasing substantially all of said platform except the region of the platform defined by said certain openings.

3. The system of claim 2 wherein said certain openings are defined by sidewalls formed by said platform, said sidewalls including thermal energy reflecting means having low emissivity and low absorptivity to said radiating thermal energy.

4. The system of claim 1 wherein said system includes means for partially thermally coupling said device to said platform.

5. The system of claim 1 wherein said temperature control means includes means for sensing the temperatures of said device and said platform and means responsive to the sensed temperatures for selectively thermally coupling and decoupling said device from the ambient and for selectively heating said platform in accordance with the sensed temperatures relative to said given value.

6. The system of claim 1 further including a base, and means for rigidly securing said platform to said base thermally insulated from said base.

7. The system of claim 6 wherein said securing means includes means oriented and spaced from each other so that said platform can translate and rotate as an integral unit upon thermal expansion or contraction of said securing means.

8. The system of claim 1 wherein the platform area facing said device includes means having a surface having high emissivity and high absorptivity to thermal radiant energy.

9. The system of claim 1 wherein said platform includes a plurality of rigid struts and means for connecting the struts at the ends thereof to provide an interconnected array of spaced struts.

10. The system of claim 9 wherein said device includes spaced support means having a spacing different than the spacing of said struts, said system including securing means including thermally conductive adapter means for receiving the support means of said device, said platform including adapter release means for releasably securing said adapter means thereto.

11. In a mounting structure for supporting a thermal energy producing body in a given orientation, said energy tending to radiate toward and conduct into said structure, the combination comprising:
    a support member including apertured grid means arranged for passing a portion of said radiant energy through the apertures in said grid means from one surface of said grid means past the opposite surface of said grid means,
    means for securing said body to said member in said orientation, said securing means including means for thermally conductively coupling said body to said support member, said body being located in a position on said member such that at least some of the energy it radiates passes through said apertures in said grid means and past said opposite surface to the ambient for cooling said body, and
    thermal energy insulation means secured to said member substantially encasing said member except for said apertures to substantially thermally decouple said member from the ambient outside said apertures, said grid means and said insulation means tending to maintain the temperature of said member at substantially the same temperature as said body whereby as said member and said body are maintained at substantially the same temperature, distortion-producing temperature gradients in said member which might otherwise occur are substantially avoided.

12. The structure of claim 11 wherein said structure tends to have a temperature that deviates from a given value, said structure further including temperature control means mounted on said structure and responsive to the temperature of said structure for selectively conductively applying thermal energy to said structure and for selectively coupling and decoupling said radiant energy to the ambient to maintain the temperature of said structure at said given value.

13. The structure of claim 11 further including moveable shutter means disposed on said opposite surface for containing said passed radiant energy and for decoupling said apertures from the ambient in accordance with the temperature of said structure, and temperature sense and control means responsive to the temperature of said structure thermally coupled to said structure and coupled to said shutter means for operating said shutter means in response to the sensed temperature of said structure for maintaining said structure at a given temperature.

14. A thermally stable mounting system comprising:

a thermally conductive grid-like platform having a plurality of openings, a heat generating device secured to the platform in a given orientation, said device tending to exhibit a temperature greater in magnitude than a given value, a base, means for rigidly securing said platform to said base thermally insulated from said base, said means for rigidly securing including means oriented and spaced from each other so that said platform can translate and rotate as an integral unit upon thermal expansion or contraction of said means for securing, and temperature control means coupled to said platform and said device for maintaining said platform and device substantially isothermal at a temperature of about said given value, said control means including means for selectively radiating thermal energy to the ambient from said device through said platform openings for maintaining said device at a temperature of about said given value.

* * * * *